United States Patent
Nakayama et al.

(10) Patent No.: US 7,015,296 B2
(45) Date of Patent: Mar. 21, 2006

(54) PREPARATION OF LINEAR ORGANOSILOXANE POLYMERS

(75) Inventors: Hiroshi Nakayama, Annaka (JP); Masao Maruyama, Annaka (JP); Hiromi Nakabayashi, Annaka (JP); Masaaki Furuya, Tokyo (JP); Tetsuo Nakanishi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 164 days.

(21) Appl. No.: 10/320,544

(22) Filed: Dec. 17, 2002

(65) Prior Publication Data
US 2003/0144449 A1 Jul. 31, 2003

(30) Foreign Application Priority Data
Dec. 17, 2001 (JP) ............... 2001-382851

(51) Int. Cl.
*C08G 77/06* (2006.01)
(52) U.S. Cl. .............. 528/14; 528/10; 528/12; 556/450; 556/462; 556/466; 556/467; 556/469
(58) Field of Classification Search .......... 528/10, 528/14, 12; 556/450, 462, 466, 467, 469
See application file for complete search history.

(56) References Cited

U.S. PATENT DOCUMENTS

| 5,310,844 A | * | 5/1994 | Weber et al. ............... 528/14 |
| 5,352,751 A | * | 10/1994 | Cocco ....................... 528/14 |
| 5,380,902 A | | 1/1995 | Hager et al. |
| 5,420,221 A | | 5/1995 | Razzano et al. |
| 5,429,221 A | * | 7/1995 | Tanzer .................... 192/85 V |
| 5,919,883 A | * | 7/1999 | Dittrich et al. ............ 528/15 |
| 6,136,996 A | | 10/2000 | Rubinsztajn et al. |
| 6,252,100 B1 | * | 6/2001 | Herzig .................... 556/450 |

FOREIGN PATENT DOCUMENTS

| EP | 0 559 045 A1 | 9/1993 |
| JP | 10-511996 A | 11/1998 |
| WO | WO 96/18670 A1 | 6/1996 |
| WO | WO 96/19527 A2 | 6/1996 |

\* cited by examiner

*Primary Examiner*—Johann Richter
*Assistant Examiner*—Chukwuma Nwaonicha
(74) *Attorney, Agent, or Firm*—Birch, Stewart Kolasch & Birch, LLP

(57) ABSTRACT

By reacting two types of organosiloxane compounds in the presence of an alkaline compound and under conditions that do not substantially promote equilibration reaction, a linear organosiloxane polymer having a single peak molecular weight distribution is simply and economically produced with minimized formation of cyclics.

10 Claims, No Drawings

PREPARATION OF LINEAR ORGANOSILOXANE POLYMERS

This invention relates to a process for preparing a linear organosiloxane polymer with minimized formation of cyclics.

BACKGROUND OF THE INVENTION

Linear organosiloxane polymers as typified by silicone oils are generally organosilicon compounds possessing a straight or branched chain structure of siloxane bonds and having organic groups attached to silicon atoms, typically alkyl and aryl groups. They have been widely utilized in the industry because their viscosity can be adjusted over a wide range and because they largely differ in heat and freeze resistance, viscosity change with temperature, and living body activity from ordinary organic compounds such as mineral oils, animal oils and vegetable oils.

These linear organosiloxane polymers are generally prepared by either of two known processes, equilibration and polycondensation processes. The equilibration process, which is most commonly employed in preparing linear organosiloxane polymers, uses acidic or basic materials as catalysts to yield an equilibrated polymer product of linear polymers and cyclic oligomers. Since the polymer obtained by this process contains about 15% of cyclic oligomers, linear polymers must be isolated as by stripping, giving rise to undesired problems such as an extended process time and an increased cost.

On the other hand, the polycondensation process is to produce linear organosiloxane polymers by starting with siloxane monomers or oligomers and promoting condensation of end groups in the presence of suitable condensation catalysts. A variety of condensation catalysts are known in the art, for example, phosphorus nitride chlorides as described in U.S. Pat. Nos. 5,380,902 and 6,136,996 and relatively weakly acidic or basic catalysts. Phosphorus nitride chlorides (PNC) are allegedly preferred. The condensation process is advantageous over the equilibration process in that no cyclic oligomers are produced. Products of high purity impose only a little stripping burden, and some products of fully high purity are ready for use without a need for stripping. However, the condensation process is applicable to only the preparation of hydroxy-terminated oils and not applicable to the preparation of other linear organosiloxane polymers, that is, linear organosiloxane polymers terminated with saturated or unsaturated hydrocarbon groups or aryl groups.

Under the above-described circumstances, there have been a need to have a process capable of linear organosiloxane polymers without limits on terminal substituent groups and with no or little formation of cyclic oligomers. A number of research works have been made therefor.

For example, U.S. Pat. No. 5,420,221 discloses a process for producing a linear organosiloxane polymer by disproportionating or condensing and disproportionating a mixture of two organosiloxanes having different molecular weights, using a mixture of a phosphorus-nitrogen homopolymeric or oligomeric compound, sulfuric acid, fluorinated alkane sulfonic acid, and kaolin clay, without increasing the cyclics content. This process is successful in producing the desired linear organosiloxane polymer without limits on the type thereof and without forming substantial quantities of cyclics.

However, phosphorus nitride chlorides used as the catalyst in the process are less stable to water, for example, readily hydrolyzable with air-borne moisture or water formed during polycondensation, substantially losing catalysis. Therefore, the phosphorus nitride chlorides are hardly regarded as easy to handle from the industrial standpoint, and in particular, difficult to use in reactions using silanol-terminated organosiloxanes which are of interest as starting reactants. Also, fluorinated alkane sulfonic acids as typified by trifluoromethanesulfonic acid used in the process are difficult to handle because of their strong acidity and high toxicity. An additional problem arises from kaolin clay which is difficult to purify, with the increased risk of impurities being leached out to contaminate the product, requiring a separate impurity removal step.

JP-A 10-511996 discloses a process for producing a polyorganosiloxane free of cyclics, using phosphorus nitrile chloride and perfluoroalkylsulfonic acid or using the reaction product of phosphorus nitrile chloride with silyl phosphate. Like the process described just above, this process can produce a desired linear organosiloxane polymer without forming cyclic oligomers. As used therein, phosphorus nitrile chloride is highly susceptible to hydrolysis, and perfluoroalkylsulfonic acid is strongly acidic and highly toxic, and both are difficult to handle. When the reaction product of phosphorus nitrile chloride with silyl phosphate is used, the catalyst is improved in stability, but takes a long time to prepare it and is expensive. Consequently, the process is uneconomical.

SUMMARY OF THE INVENTION

An object of the invention is to provide a process for producing a linear organosiloxane polymer having a single peak molecular weight distribution in a simple and economical manner, with minimized formation of cyclic oligomers.

It has been found that by reacting two types of organosiloxane polymers under proper conditions in the presence of an alkaline compound as the condensation catalyst, a linear organosiloxane polymer having a single peak molecular weight distribution can be produced with minimized formation of cyclics.

Specifically, the invention provides a process for preparing a linear organosiloxane polymer, comprising the step of reacting a compound of the following formula (1) with a compound of the following formula (2) in the presence of an alkaline compound and under conditions that do not substantially promote equilibration reaction, thereby producing a linear organosiloxane polymer having a single peak molecular weight distribution with minimized formation of cyclics.

Formula (1):

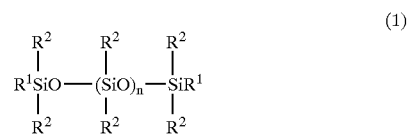

Herein $R^1$ is each independently a substituted or unsubstituted monovalent hydrocarbon group having 1 to 8 carbon atoms or an alkoxy group having 1 to 8 carbon atoms, $R^2$ is each independently a substituted or unsubstituted monovalent hydrocarbon group having 1 to 8 carbon atoms, and n is an integer of 0 to 500.

Formula (2):

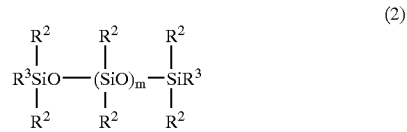

Herein $R^2$ is as defined above, $R^3$ is each independently a substituted or unsubstituted monovalent hydrocarbon group having 1 to 8 carbon atoms, an alkoxy group having 1 to 8 carbon atoms or a hydroxyl group, and m is an integer of 10 to 3,000.

Preferably, the alkaline compound is an alkali metal hydroxide or siliconate. A typical alkali metal is sodium.

DESCRIPTION OF THE PREFERRED EMBODIMENTS

Referring to formula (1), $R^1$ is each independently selected from substituted or unsubstituted monovalent hydrocarbon groups having 1 to 8 carbon atoms and alkoxy groups having 1 to 8 carbon atoms, for example, alkyl groups such as methyl, ethyl and propyl, cycloalkyl groups such as cyclohexyl, alkenyl groups such as vinyl and allyl, aryl groups such as phenyl and tolyl, alkoxy groups such as methoxy, ethoxy and propoxy, and substituted ones of the foregoing in which hydrogen atoms are partially substituted with halogen atoms (e.g., chloro, fluoro or bromo), cyano groups or the like, such as trifluoropropyl. Of these, substituted or unsubstituted monovalent hydrocarbon groups having 1 to 8 carbon atoms are preferred, with methyl, phenyl and vinyl being especially preferred.

In formula (1), n is an integer of 0 to 500, and preferably 0 to 100.

In formulae (1) and (2), $R^2$ is each independently selected from substituted or unsubstituted monovalent hydrocarbon groups having 1 to 8 carbon atoms, examples of which are the same as enumerated for $R^1$ except the alkoxy groups.

In formula (2), $R^3$ is each independently selected from among substituted or unsubstituted monovalent hydrocarbon groups having 1 to 8 carbon atoms, alkoxy groups having 1 to 8 carbon atoms and hydroxyl groups. Examples of the substituted or unsubstituted monovalent hydrocarbon groups having 1 to 8 carbon atoms include alkyl, alkenyl and aryl groups as enumerated for $R^1$. Examples of the alkoxy groups are the same as above. Of these, substituted or unsubstituted monovalent hydrocarbon groups having 1 to 8 carbon atoms and hydroxyl groups are preferred, with methyl, phenyl, vinyl and hydroxyl being especially preferred.

In formula (2), m is an integer of 10 to 3,000 and preferably 30 to 1,000.

Preferably, the compounds of formulae (1) and (2) are substantially free of cyclic oligomers, that is, having a cyclic oligomer content of less than about 5,000 ppm, especially less than about 3,000 ppm. Since the process of the invention entails formation of no substantial quantities of cyclic oligomers, the use of cyclic oligomer-free reactants results in production of a linear organosiloxane polymer which is ready for use without a need for removal of cyclics as by stripping. Then the process becomes more simple and the cost of the product is further reduced.

The process of the invention carries out polymerization reaction in the presence of an alkaline compound, that is, using an alkaline compound as the catalyst. The alkaline compound used herein means a basic compound generally known as Bronsted base. Exemplary alkaline compounds include hydroxides, oxides, phosphorus hydroxides and siliconates of alkali metals, and hydroxides, oxides, phosphorus hydroxides and siliconates of alkaline earth metals, as well as ammonia and ammonium salts. Of these, hydroxides and siliconates of alkali metals are preferred, with sodium hydroxide and sodium siliconate being most preferred.

The alkaline compound is preferably added at a concentration of 1 to 300 ppm based on the starting reactants, with a concentration of 1 to 100 ppm, especially 1 to 20 ppm being more preferred. An addition concentration of less than 1 ppm may fail to provide a satisfactory rate of reaction. At an addition concentration of more than 300 ppm, a more amount of neutralized salt may form after deactivation of the catalyst, probably imposing an increased filtration burden.

It is noted that the alkali metal hydroxide is generally known as a catalyst for accelerating equilibration reaction. With a deliberate choice of a catalyst species, catalyst concentration and reaction temperature, the process of the invention substantially controls formation of cyclic oligomers by equilibration reaction. As a consequence, there is obtained a linear organosiloxane polymer whose molecular weight distribution has a single peak as determined by gel permeation chromatography (GPC).

In one embodiment wherein both $R^1$ and $R^3$ in formulae (1) and (2) are monovalent hydrocarbon groups, the process of the invention is useful in producing a linear organosiloxane polymer having an intermediate degree of polymerization between the compounds of formulae (1) and (2), because reaction proceeds according to the scheme shown below.

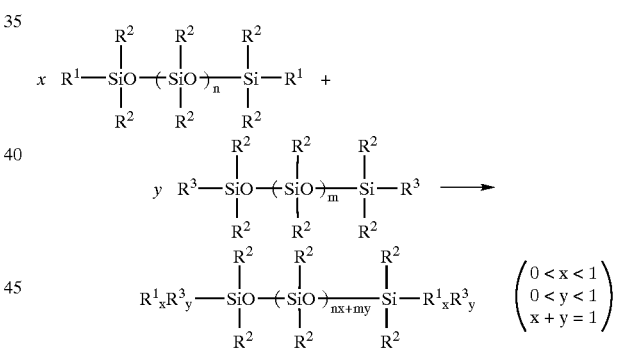

In another embodiment wherein $R^1$ in formula (1) is a monovalent hydrocarbon group and $R^3$ in formula (2) is a silanol or alkoxy group, the process of the invention is useful in producing a linear organosiloxane polymer having a higher degree of polymerization than the compounds of formulae (1) and (2), because condensation reaction of silanol or alkoxy groups takes place.

More illustratively, the process of the invention is practiced as follows. First, a compound of formula (1) (e.g., polydimethylsiloxane having trimethylsilyl terminus) and a compound of formula (2) (e.g., polydimethylsiloxane having trimethylsilyl terminus, or polydimethylsiloxane having silanol terminus) are mixed. With stirring, the mixture is heated at a temperature below 150° C., preferably 90 to 140° C., more preferably 100 to 120° C.

Subsequently, an alkaline compound as the catalyst, preferably in an amount of 1 to 300 ppm, is added to the mixture held at the above-described temperature. Reaction is carried out for about 30 minutes to 10 hours, more preferably about 1 to 4 hours, yielding a linear organosiloxane polymer.

The mixing proportion of the compound of formula (1) and the compound of formula (2) may be determined as appropriate in accordance with the viscosities of these reactants, and the viscosity of the end linear organosiloxane polymer, and preferably ranges from 5:95 to 95:5, more preferably from 10:90 to 90:10 in weight ratio.

The reaction pressure is not critical. When a hydroxyl-terminated organopolysiloxane is used as one reactant, it is recommended to carry out polymerization reaction under reduced pressure. At the end of the process, the alkaline compound serving as the catalyst can be deactivated by neutralizing with any acidic substance. Organic acids such as ethylene chlorohydrin are preferably used as the neutralizing agent when compatibility with the linear organosiloxane polymer is taken into account.

The process of the invention may be practiced either continuously or batchwise. Use of a continuous reactor is advantageous from the industrial aspect.

The process of the invention is successful in substantially controlling formation of cyclics, typically to 1% by weight or less, especially 0.5% by weight or less of cyclics. The content of cyclics in the final linear organosiloxane polymer can be 3% by weight or less, especially 2% by weight or less, although it depends on the content of cyclic impurities in the starting reactants.

EXAMPLE

Examples of the invention are given below by way of illustration and not by way of limitation. Viscosity is measured at 25° C. and expressed in centistoke (cs).

Example 1

A four-necked separable flask having an internal volume of 1000 ml and equipped with a thermometer and a Dimroth condenser was charged with 50 parts by weight of a trimethylsilyl-terminated polydimethylsiloxane having an average degree of polymerization (n) of 80 and a viscosity of 100 cs and 50 parts by weight of a trimethylsilyl-terminated polydimethylsiloxane having an average degree of polymerization (m) of 520 and a viscosity of 10,000 cs. The flask was then held in an oil bath, and with stirring, the contents were heated and adjusted at 120° C. Then 0.22 part by weight (11 ppm) of a 0.5 wt % NaOH aqueous solution was added to the flask where reaction was continued for 4 hours. Thereafter, 0.01 part by weight of ethylene chlorohydrin was added as the neutralizing agent.

After neutralization, structural analysis by NMR was carried out to confirm the production of a polydimethylsiloxane oil terminated with trimethylsilyl groups and having an average degree of polymerization of 290. On GPC analysis, the molecular weight distribution was found to have a single peak. The oil had a viscosity of 2,160 cs. The amount of cyclics formed was 0.95% by weight, demonstrating that formation of cyclics is minimized in contrast with equilibration reaction.

Example 2

A reactor as used in Example 1 was further equipped with a vacuum line including a vacuum pump and a distillate trap. The separable flask was charged with 50 parts by weight of a vinyldimethyl-terminated polydimethylsiloxane having an average degree of polymerization (n) of 220 and a viscosity of 1,000 cs and 50 parts by weight of a silanol-terminated polydimethylsiloxane having an average degree of polymerization (m) of 35 and a viscosity of 70 cs. The flask was then held in an oil bath, and with stirring, the contents were heated and adjusted at 120° C. Then 0.22 part by weight of a 0.5 wt % NaOH aqueous solution was added to the flask which was held for 10 minutes under atmospheric pressure. The vacuum pump was then activated to perform evacuation to a vacuum of 3 Torr. Strenuous generation of water was observed from 10 minutes after the start of evacuation, and water generation ceased after about 60 minutes.

Reaction was further continued for 30 minutes, after which 0.01 part by weight of ethylene chlorohydrin was added as the neutralizing agent.

After neutralization, NMR structural analysis was carried out to confirm the production of a polydimethyl-siloxane oil terminated with trimethylsilyl groups and having an average degree of polymerization of 480. GPC analysis revealed a molecular weight distribution having a single peak. The oil had a viscosity of 6,500 cs.

The oil recovered from the flask and the trap was 99.4% by weight based on the weight of the starting reactants. The recovered oil contained 1.2% by weight of cyclics.

Example 3

Polymerization reaction was carried out as in Example 2 except that the starting reactants used were 50 parts by weight of a vinyldimethyl-terminated polydimethylsiloxane having an average degree of polymerization (n) of 210 and a viscosity of 1,000 cs and 50 parts by weight of a silanol-terminated polydimethylsiloxane having an average degree of polymerization (m) of 35 and a viscosity of 70 cs.

As in Example 2, neutralization was followed by NMR structural analysis to confirm the production of a polydimethylsiloxane oil terminated with vinyldimethylsilyl groups and having an average degree of polymerization of 490. GPC analysis revealed a molecular weight distribution having a single peak. The oil had a viscosity of 6,580 cs.

The oil recovered from the flask and the trap was 99.3% by weight based on the weight of the starting reactants. The recovered oil contained 0.88% by weight of cyclics.

Example 4

A reactor as in Example 2 was used. The separable flask was charged with 16 parts by weight of a trimethylsilyl-terminated polydimethylsiloxane having an average degree of polymerization (n) of 220 and a viscosity of 1,000 cs and 84 parts by weight of a silanol-terminated polydimethylsiloxane having an average degree of polymerization (m) of 35 and a viscosity of 70 cs. The flask was then held in an oil bath, and with stirring, the contents were heated and adjusted at 120° C.

Then 0.3 part by weight (15 ppm) of a 0.5 wt % KOH aqueous solution was added to the flask which was held for 10 minutes under atmospheric pressure. The vacuum pump was then activated to perform evacuation to a vacuum of 3 Torr. Strenuous generation of water was observed from 6 minutes after the start of evacuation, and water generation ceased after about 50 minutes.

Reaction was further continued for 30 minutes, after which 0.01 part by weight of ethylene chlorohydrin was added as the neutralizing agent.

After neutralization, NMR structural analysis was carried out to confirm the production of a dimethylsiloxane oil terminated with trimethylsilyl groups and having an average degree of polymerization of 1,370. GPC analysis revealed a molecular weight distribution having a single peak. The oil had a viscosity of 270,000 cs.

The oil recovered from the flask and the trap was 99.2% by weight based on the weight of the starting reactants. The recovered oil contained 1.1% by weight of cyclics.

Comparative Example 1

A reactor as in Example 2 was used. The separable flask was charged with 50 parts by weight of a vinyldimethyl-terminated polydimethylsiloxane having an average degree of polymerization (n) of 220 and a viscosity of 1,000 cs and 50 parts by weight of a silanol-terminated polydimethylsiloxane having an average degree of polymerization (m) of 35 and a viscosity of 70 cs. The flask was then held in an oil bath, and with stirring, the contents were heated and adjusted at 150° C. Then 0.3 part by weight of a 0.5 wt % KOH aqueous solution was added to the flask, after which reaction was continued for 4 hours. Thereafter, 0.01 part by weight of ethylene chlorohydrin was added as the neutralizing agent.

After neutralization, the oil was GPC analyzed to find a molecular weight distribution having two peaks. Volatiles were removed from the oil at 250° C. and 5 Torr. The volatiles amounted to 13.8% by weight and were mainly composed of cyclics of 3 to 6 monomeric units.

Comparative Example 2

A reactor as in Example 2 was used. The separable flask was charged with 50 parts by weight of a trimethylsilyl-terminated polydimethylsiloxane having an average degree of polymerization (n) of 220 and a viscosity of 1,000 cs and 50 parts by weight of a silanol-terminated polydimethylsiloxane having an average degree of polymerization (m) of 35 and a viscosity of 70 cs. The flask was then held in an oil bath, and with stirring, the contents were heated and adjusted at 150° C. Then 0.22 part by weight of a 0.5 wt % KOH aqueous solution was added to the flask, after which reaction was continued for 4 hours. Thereafter, 0.01 part by weight of ethylene chlorohydrin was added as the neutralizing agent.

After neutralization, the oil was GPC analyzed to find a molecular weight distribution having two peaks. Volatiles were removed from the oil at 250° C. and 5 Torr. The volatiles amounted to 6.7% by weight and were mainly composed of cyclics of 3 to 6 monomeric units.

Comparative Example 3

A reactor as in Example 2 was used. The separable flask was charged with 50 parts by weight of a trimethylsilyl-terminated polydimethylsiloxane having an average degree of polymerization (n) of 220 and a viscosity of 1,000 cs and 50 parts by weight of a silanol-terminated polydimethylsiloxane having an average degree of polymerization (m) of 35 and a viscosity of 70 cs. The flask was then held in an oil bath, and with stirring, the contents were heated and adjusted at 120° C. Then 20 ppm of a PNC catalyst, Cl$_3$PN(PNCl$_2$)PCl$_3$.PCl$_6$ was added to the flask, which was held for 10 minutes under atmospheric pressure. The vacuum pump was then activated to perform evacuation to a vacuum of 3 Torr. Strenuous generation of water was observed from 7 minutes after the start of evacuation, and water generation ceased after about 5 minutes. Further, 20 ppm of the PNC catalyst was added, but water generation ceased after about 5 minutes as in the previous step.

The molecular weight distribution of the resulting oil was analyzed, finding the presence of unreacted residues because the catalyst added was deactivated on the way of reaction as described just above.

The resulting oil had a viscosity of 1,800 cs, which was extremely lower than in Example 2.

According to the invention, two organosiloxane compounds are reacted in the presence of an alkaline compound and under conditions that do not substantially promote equilibration reaction, whereby a linear organosiloxane polymer having a single peak molecular weight distribution is produced in a simple and economical manner while formation of cyclics is minimized.

Japanese Patent Application No. 2001-382851 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A process for preparing a linear organosiloxane polymer, comprising the step of
reacting a compound of the following formula (1) with a compound of the following formula (2) in the presence of an alkaline compound and under conditions that do not substantially promote equilibration reaction, thereby producing a linear organosiloxane polymer having a single peak molecular weight distribution with minimized formation of cyclics,
formula (1):

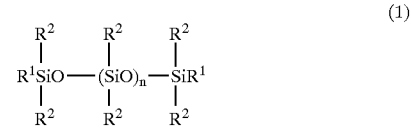

wherein $R^1$ is each independently a substituted or unsubstituted monovalent hydrocarbon group having 1 to 8 carbon atoms or an alkoxy group having 1 to 8 carbon atoms, $R^2$ is each independently a substituted or unsubstituted monovalent hydrocarbon group having 1 to 8 carbon atoms, and n is an integer of 0 to 500,
formula (2):

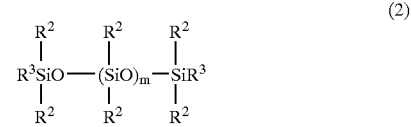

wherein $R^2$ is as defined above, $R^3$ is each independently a substituted or unsubstituted monovalent hydrocarbon group having 1 to 8 carbon atoms, an alkoxy group having 1 to 8 carbon atoms or a hydroxyl group, and m is an integer of 10 to 3,000.

2. The process of claim 1 wherein the alkaline compound is an alkali metal hydroxide or alkali metal siliconate.

3. The process of claim 2 wherein the alkali metal is sodium.

4. The process of claim 1, wherein the alkaline compound is added at a concentration of 1 to 300 ppm based on the starting reactants.

5. The process of claim 1, wherein both $R^1$ and $R^3$ in formulae (1) and (2) are monovalent hydrocarbon groups.

6. The process of claim 1, wherein $R^1$ in formula (1) is a monovalent hydrocarbon group and $R^3$ in formula (2) is a silanol or alkoxy group.

7. The process of claim 1, wherein the mixing proportion of the compound of formula (1) and the compound of formula (2) ranges from 5:95 to 95:5 in weight ratio.

8. The process of claim 1, wherein the reaction is conducted at a temperature of 90 to 150° C.

9. The process of claim 8, wherein the reaction is conducted at a temperature of 90 to 140° C.

10. A process for preparing a linear organosiloxane polymer, comprising the step of reacting a compound of the following formula (1) with a compound of the following formula (2) in the presence of an alkaline compound and at a temperature of 100 to 120° C. under conditions that do not substantially promote equilibration reaction, thereby producing a linear organosiloxane polymer having a single peak molecular weight distribution with minimized formation of cyclics, formula (1):

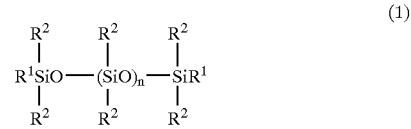

wherein $R^1$ is each independently a substituted or unsubstituted monovalent hydrocarbon group having 1 to 8 carbon atoms or an alkoxy group having 1 to 8 carbon atoms, $R^2$ is each independently a substituted or unsubstituted monovalent hydrocarbon group having 1 to 8 carbon atoms, and n is an integer of 0 to 500, formula (2):

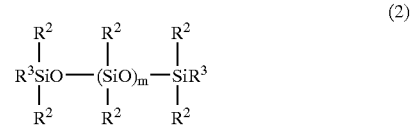

wherein $R^2$ is as defined above, $R^3$ is each independently a substituted or unsubstituted monovalent hydrocarbon group having 1 to 8 carbon atoms, an alkoxy group having 1 to 8 carbon atoms or a hydroxyl group, and m is an integer of 10 to 3,000.

* * * * *